United States Patent [19]

Khalifa et al.

[11] Patent Number: 5,024,118
[45] Date of Patent: Jun. 18, 1991

[54] STEERING COLUMN GUIDE STRUCTURE

[75] Inventors: Mustafa A. Khalifa, Dearborn; James Chapp, Jr., West Bloomfield, both of Mich.

[73] Assignee: Chrysler Corporation, Highland Park, Mich.

[21] Appl. No.: 468,349

[22] Filed: Jan. 22, 1990

[51] Int. Cl.$^5$ ............................................. B62D 1/18
[52] U.S. Cl. ...................... 74/492; 188/376; 248/900; 280/777
[58] Field of Search .................. 74/492; 280/777; 188/376; 248/900

[56] References Cited

U.S. PATENT DOCUMENTS

| | | | |
|---|---|---|---|
| 3,702,081 | 11/1972 | Arnston | 74/492 |
| 3,703,106 | 11/1972 | Arntson et al. | 74/492 |
| 3,864,988 | 2/1975 | Adams, III | 74/492 |
| 3,916,720 | 11/1975 | Smith | 74/492 |
| 3,980,314 | 9/1976 | Kopf | 74/492 X |
| 4,000,876 | 1/1977 | Usui et al. | 74/492 X |
| 4,050,326 | 9/1977 | Kopf | 74/492 |
| 4,098,141 | 7/1978 | Yamaguchi | 74/492 |
| 4,102,217 | 7/1978 | Yamamoto et al. | 188/376 X |
| 4,616,522 | 10/1986 | White et al. | 74/492 |
| 4,786,076 | 11/1988 | Wierschem | 74/492 X |

*Primary Examiner*—Allan D. Herrmann
*Attorney, Agent, or Firm*—Edward A. Craig

[57] ABSTRACT

A steering column guide structure is provided for a collapsible vehicle steering column. The guide structure includes triangular guide members adjacent to and above the upper portion of the steering column which prevent upward movement of the upper portion of the steering column upon collapse thereof. A guide collar is provided around the lower portion of the steering column to axially guide the lower portion of the steering column upon collapse thereof.

1 Claim, 3 Drawing Sheets

STEERING COLUMN GUIDE STRUCTURE

BACKGROUND OF THE INVENTION

1. Technical Field

The present invention relates to an energy absorbing steering column assembly. More particularly, the present invention relates to a guide structure for a collapsible energy absorbing steering column assembly which resists upward and non-axial movement and which transfers non-axial forces imposed on the steering column during collision to the energy absorbing member.

2. Description of Related Art

In the past it has been common to provide various energy absorbing and collapsible steering column assemblies in an effort to reduce injury to a driver during collision. Examples of various steering columns are shown in the following: U.S. Pat. No. 3,702,081 to Arnston; U.S. Pat. No. 3,703,106 to Arntson et al.; U.S. Pat. No. 3,864,988 to Adams, III; U.S. Pat. No. 3,916,720 to Smith; U.S. Pat. No. 3,980,314 to Kopf; U.S. Pat. No. 4,000,876 to Usui et al.; U.S. Pat. No. 4,050,326 to Kopf; U.S. Pat. No. 4,098,141 to Yamaguchi; U.S. Pat. No. 4,102,217 to Yamamoto et al.; and U.S. Pat. No. 4,786,076 to Wierschem.

Due to the forces generated on the steering column by the individual contacting the steering wheel during collision, the steering column tends to move in an upward direction along with moving forward.

There has been a need in the art to provide a guide structure for the steering column which inhibits upward movement of the steering column during collision, which directs movement in an axial direction during collision and which transfers non-axial forces imposed on the steering column to the energy absorbing bracket of a steering column.

SUMMARY OF THE INVENTION

A steering column guide structure is provided for a collapsible vehicle steering column. The steering column includes a sleeve having a steering wheel assembly secured to the upper end thereof. A steering shaft extends from the steering wheel assembly through the sleeve. An upper support bracket is secured to vehicle support structure. A sleeve bracket is provided. The sleeve bracket releasably connects the upper portion of the sleeve to the upper support bracket. The sleeve bracket includes a pair of spaced apart flanges.

A lower support bracket is provided. The lower support bracket includes a frangible retainer. The lower support bracket is secured to vehicle support structure. The frangible retainer is connected to the lower portion of the sleeve.

The steering column guide structure comprises a pair of spaced apart triangular guide members. Each triangular guide member is secured to the upper support bracket adjacent to and above one of the flanges of the sleeve bracket. Each of the triangular guide members includes a ramp surface formed by a leg thereof.

A guide collar is provided. The guide collar is connected to the lower support bracket. The guide collar includes an axially extending cylindrical surface encircling the lower portion of the sleeve. The cylindrical surface is spaced slightly from the sleeve.

Upon collapse of the steering column, the flanges of the sleeve bracket will slide on the ramp surfaces of the triangular guide members thereby preventing upward movement of the upper portion of the sleeve. The lower portion of the sleeve will be axially guided by the guide collar thereby preventing undue axial deviation of the lower portion of the sleeve.

DESCRIPTION OF THE PREFERRED EMBODIMENT

Figure 1:
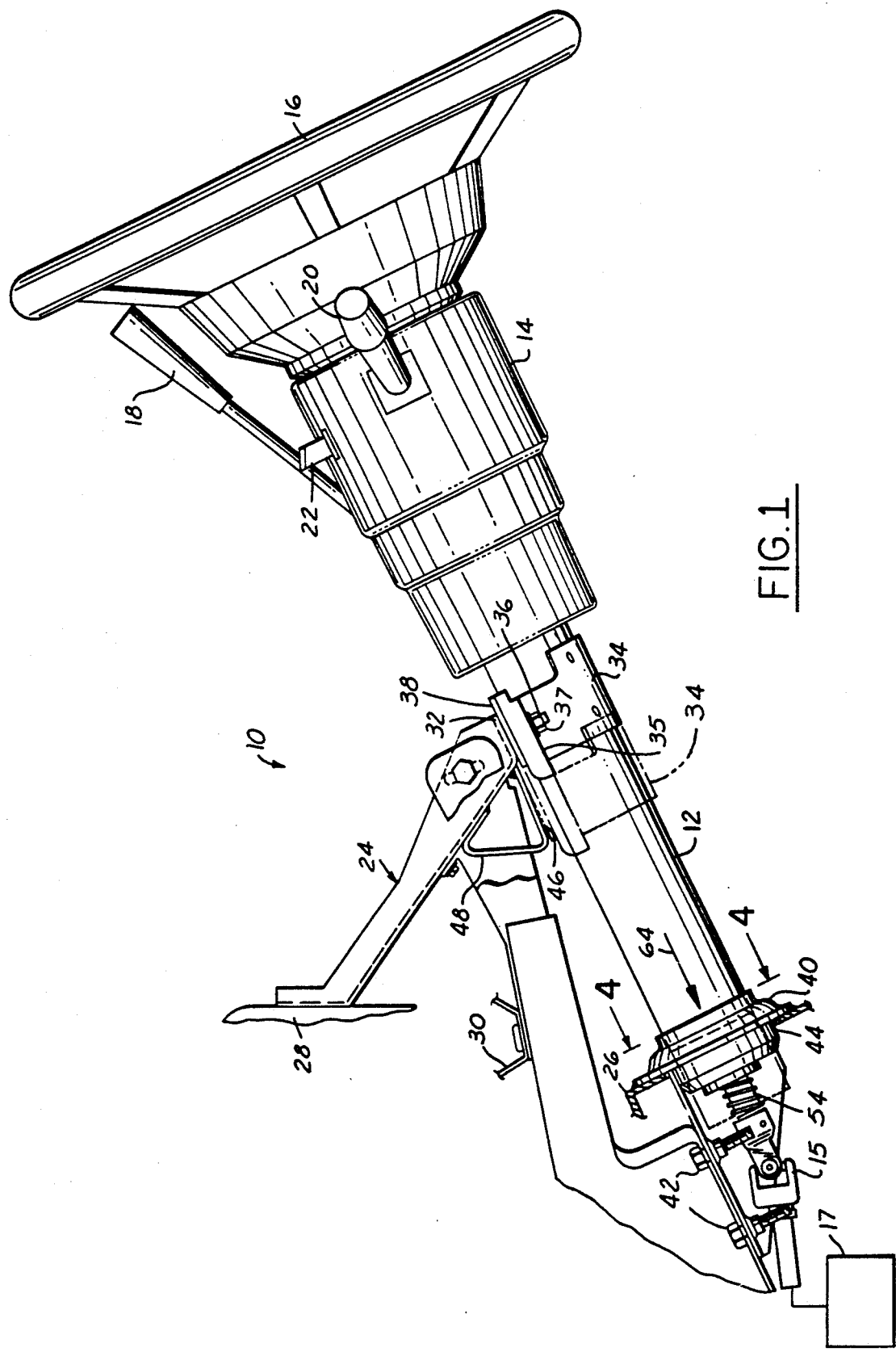
FIG. 1 is a side elevational view of the steering column guide structure assembly of the present invention shown in operational relationship with a steering column.

Referring now to the drawings, specifically to FIG. 1, a steering column is generally shown at 10. The steering column 10 includes a rigid sleeve 12 and a steering shaft 54 which is connected to a steering wheel assembly 14 at its upper end and is connected to a shaft coupler 15 at its lower end. Shaft coupler 15 in turn is operably connected to a steering gear assembly 17 for steering of the wheels of a vehicle. Steering wheel assembly 14 includes a steering wheel 16, gear shift 18, turn signal switch 20 and hazard warning light switch 22.

An upper support bracket generally indicated at 24 and a lower support bracket generally indicated at 26 are provided for attaching the steering column by way of sleeve 12 to the vehicle.

The lower support bracket 26 includes a guide collar 40 and is secured to the brake pedal bracket 30 by bolts 42. The lower support bracket 26 is of a conventionally known type which absorbs energy during a collision by collapse and deformation thereof, such as by twisting type deformation upon non-axial forces being imposed on the bracket by the steering column.

Figure 5:
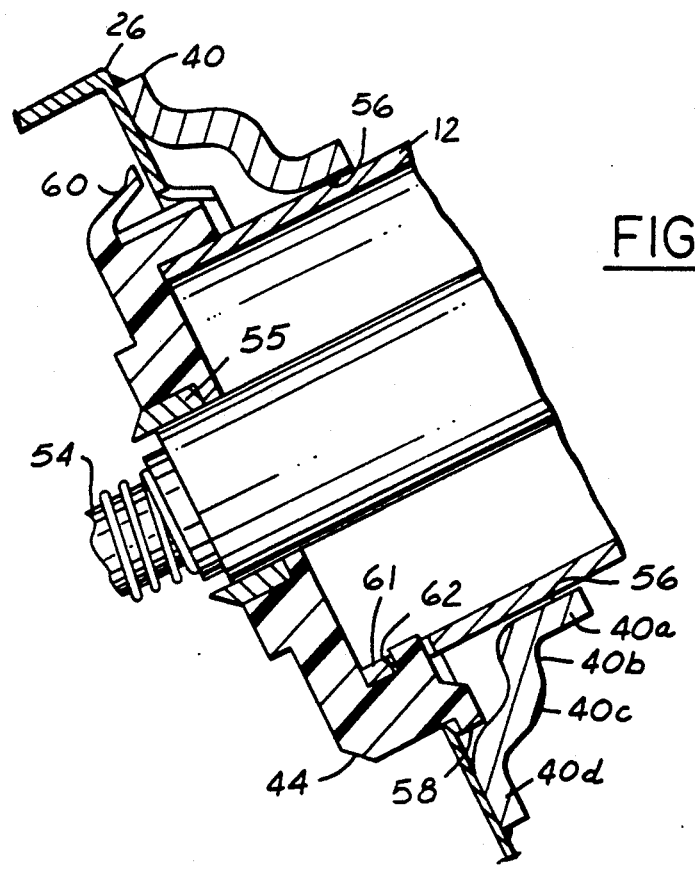
FIG. 5 is a sectional view taken along line 5—5 of FIG. 4, showing the guide collar and its immediate environment.

As best seen with reference to FIG. 5, a retainer 44 is provided which includes a plurality of radially outwardly extending tabs 58 which lock the retainer 44 in place on the lower support bracket 26, in conjunction with flexible tabs 60. A bearing surface 55 allows for rotation of the steering shaft 54 in the retainer 44. Inwardly extending tabs 61 engage bores 62 in sleeve 12 to secure the sleeve 12 to the retainer 44. Thus, during normal operation, the steering column 10 is securely held at its lower end by the retainer 44 which is secured to the lower support bracket 26. The tabs 61 and 58 are frangible upon impact such that axial movement of the steering column frangiates the tabs to allow movement of the retainer 44 out of the way of the operation of the guide structure as set forth below.

Figure 4:
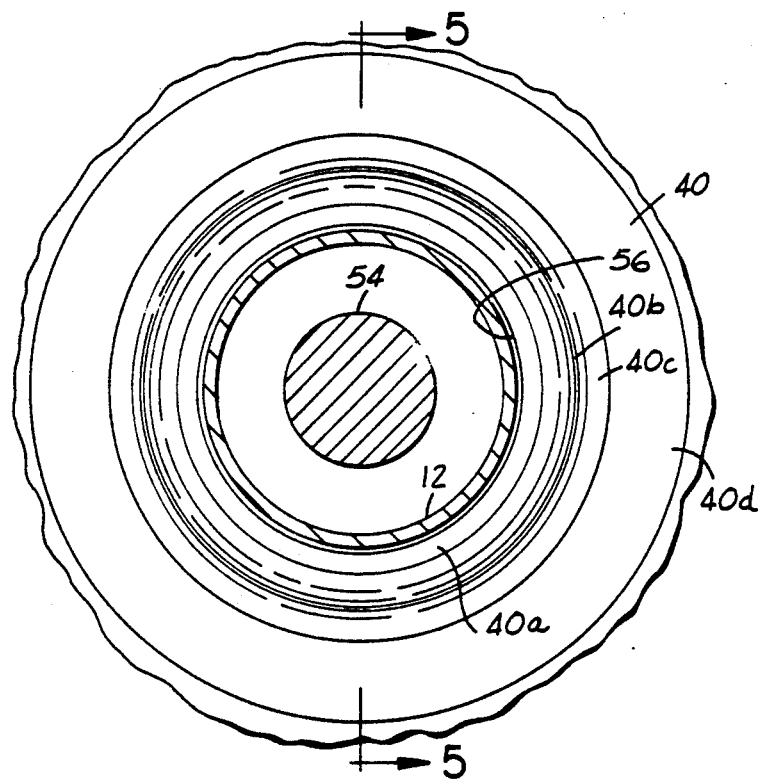
FIG. 4 is a sectional view of the steering column taken along line 4—4 of FIG. 1 showing the guide collar utilized in accordance with the teachings of the present invention.

Referring now to FIGS. 4 and 5 the guide collar 40 is shown in more detail. It will be noted that the sleeve 12 surrounds the steering shaft 54. The guide collar 40 has a cylindrical surface 56 which closely follows the periphery of the rigid sleeve of the steering shaft assembly 12 but is spaced therefrom a slight distance. The collar 40 is weldedly connected to the lower support bracket 26. The guide collar 40 includes an upwardly extending annular flange 40a for forming the cylindrical surface 56 which leads to a radially outwardly extending step portion 40b which thereafter leads into a generally axially extending portion 40c, to a radially extending annular flange 40d which is attached to the lower support bracket 26, illustratively by welding.

Figure 2:
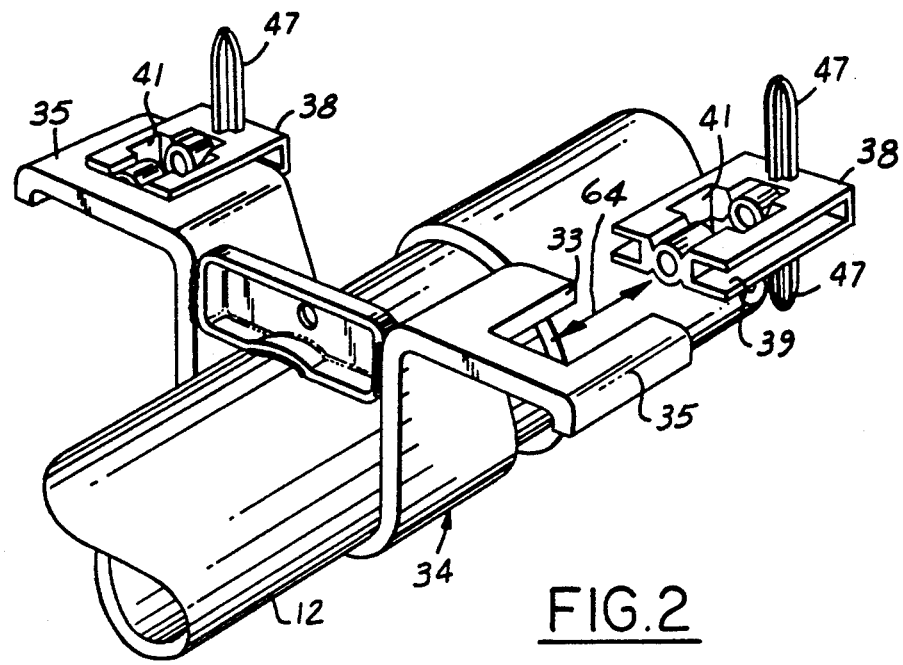
FIG. 2 is a perspective view of the release structure utilized at the upper support bracket in accordance with the teachings of the present invention.
Figure 3:
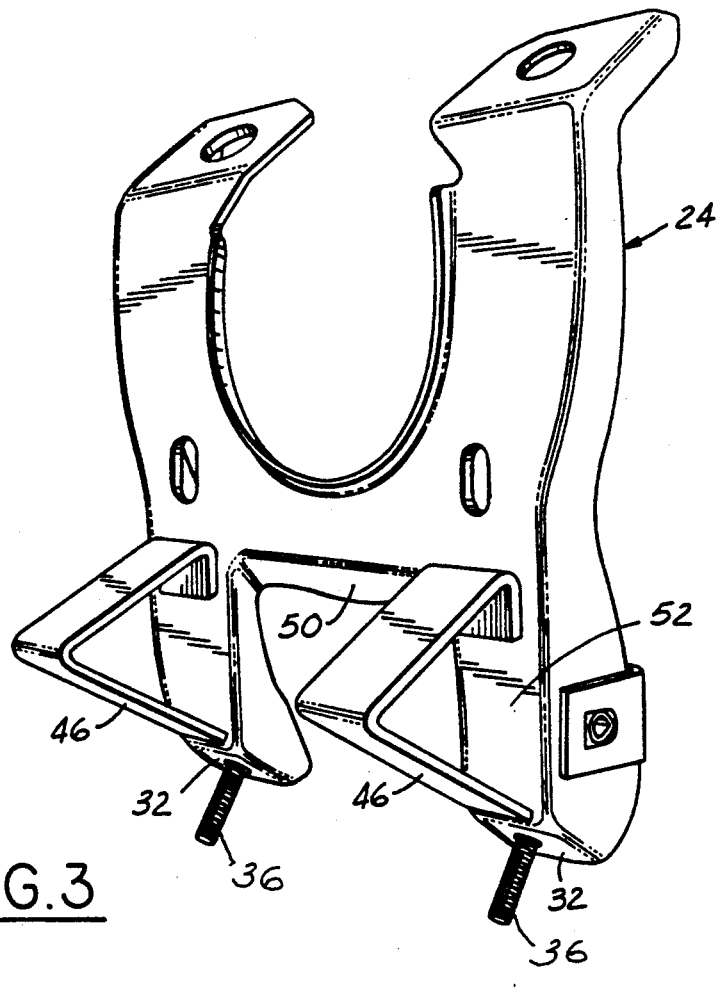
FIG. 3 is a detailed perspective view of the upper support bracket of the present invention.

Referring to FIGS. 1 and 2, the upper support bracket 24, which engages the upper end of the sleeve 12, is attached to the support structure 28 of an automobile and also is secured by way of the brake pedal bracket assembly 30 to the vehicle. The upper support bracket 24 includes flange portions 32. A sleeve bracket 34 is provided for securing the sleeve 12 to the flange portions 32 by way of cooperating flanges 35. Fastening bolts 36 are provided for securing the sleeve bracket 34 to the flange 32 by engaging a pair of spacers 38 as explained below. The pair of spacers 38 are provided to insulate the steering column from vibrations during operation of the automobile and for allowing axial movement of the steering column upon a collision type impact.

A pair of ramp surfaces 46 are formed by a pair of triangular guide members 48 which are secured to the upper support bracket 24. The ramp surfaces 46 are preferably co-planar with the flange portions 32. The ramp surfaces 46 interact with flanges 35 of the sleeve bracket 34 whereby after impact and release of the flanges 35 the ramp surfaces 46 provide a surface whereby prevention of movement of the flanges 35 and the associated steering column in an upward direction is accomplished during a collision type impact.

Referring to FIG. 2, the structure of the sleeve bracket 34 permitting connection to the upper support bracket 24 at flange portions is shown in detail. The spacers 38, preferably made of a nylon material, include a positioning lug 47 for alignment of parts during assembly. The spacers 38 include longitudinally extending grooves 39 on either side thereof which slideably engage the open ended slots 33 provided on the pair of flanges 35. Slots 33 are open in a direction generally facing the steering wheel assembly 14 to provide axially downward movement during collision as shown by arrow 64. In operation, the flanges 35 are held in position on the upper support bracket 24 by the engagement of the slots 33 by spacers 38, wherein the bolts 36 secure the spacers 38 through the central openings 41 thereby securing the flanges 35 to the upper support bracket 24. This allows the flanges 35 to release in an axial direction upon a suitable force being exerted on the steering column. Prior to collision the flanges 35 are held in place from axial movement by securement at the lower end of the sleeve 12 and by compression of the spacers 38 and flange 35 by the nuts 37 which engage bolts 36.

In operation, upon collision type impact the flanges 35 will slide outwardly along grooves 39 and away from the spacers 38, as shown in FIG. 2, allowing the rigid steering shaft 12 and attached sleeve bracket 34 to move along the ramp surface 46 to the position shown in phantom in FIG. 1 without undesirable upward movement of the sleeve 12. At the same time this is occurring, the surfaces 56 of the flange 40a of the guide collar 40 resist non-axial misalignment of the column to direct the column collapse in the axial direction. The slight spacing of the surfaces 56 from the sleeve 12 permits some tilting of the lower portion of the sleeve 12 without undue axial deviation thereof. Guide collar 40 also acts as a moment arm such that non-axial forces imposed on the steering column during collision are transferred to the lower bracket 26 to facilitate energy absorbing collapse of the lower bracket 26. Thus, the steering column assembly of the present invention moves in a general axial direction as shown by arrow 64 during collision without undesirable non-axial or upward movement.

While the above description constitutes the preferred embodiment of the present invention, it is to be appreciated that the invention is susceptible to modification, variation and change without departing from the proper scope and fair meaning of the accompanying claims.

What is claimed is:

1. A steering column guide structure for a collapsible vehicle steering column, the steering column including a sleeve, a steering wheel assembly secured to the upper end of the sleeve, a steering shaft extending from the steering wheel assembly through the sleeve, an upper support bracket secured to vehicle support structure, a sleeve bracket releasably connecting the upper portion of the sleeve to the upper support bracket, the sleeve bracket including a pair of spaced apart flanges, a lower support bracket including a frangible retainer, the lower support bracket secured to vehicle support structure, the frangible retainer connected to the lower portion of the sleeve, the steering column guide structure comprising a pair of spaced apart triangular guide members, each triangular guide member being secured to the upper support bracket adjacent to and above one of the flanges of the sleeve bracket, each of said triangular guide members including a ramp surface formed by a leg thereof, and a guide collar connected to said lower support bracket, the guide collar including an axially extending cylindrical surface encircling the lower portion of said sleeve and being spaced slightly therefrom, whereby upon collapse of the steering column the flanges of the sleeve bracket will slide on the ramp surfaces of the triangular guide members thereby preventing upward movement of the upper portion of the sleeve and the lower portion of the sleeve will be axially guided by the guide collar thereby preventing undue axial deviation of the lower portion of the sleeve.

* * * * *